United States Patent
Sasaki

(10) Patent No.: US 6,853,502 B2
(45) Date of Patent: Feb. 8, 2005

(54) LENS SYSTEM

(75) Inventor: Tadashi Sasaki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/387,533

(22) Filed: Mar. 14, 2003

(65) Prior Publication Data

US 2003/0174414 A1 Sep. 18, 2003

(30) Foreign Application Priority Data

Mar. 15, 2002 (JP) .......................................... 2002-071839
Dec. 27, 2002 (JP) .......................................... 2002-379167

(51) Int. Cl.⁷ .............................................. G02B 15/14
(52) U.S. Cl. ........................ 359/698; 396/137; 348/345
(58) Field of Search ................................ 359/626, 694, 359/696–8, 705–6, 822–3, 825; 396/137, 127, 125; 348/345–357

(56) References Cited

U.S. PATENT DOCUMENTS 4,609,944 A   9/1986  Nakada et al. ............... 348/347
4,796,045 A * 1/1989  Hamanishi et al. .......... 396/137
5,315,340 A   5/1994  Hirasawa ....................... 396/81
5,448,328 A * 9/1995  Suzuki et al. ................ 396/133
5,572,373 A  11/1996  Imanari et al. .............. 359/825

FOREIGN PATENT DOCUMENTS

JP          62-187829 A    8/1987
JP           8-29665 A     2/1996

* cited by examiner

Primary Examiner—Jordan M Schwartz
Assistant Examiner—Jessica Stultz
(74) Attorney, Agent, or Firm—Birch, Stewart, Kolasch & Birch, LLP

(57) ABSTRACT

In a lens system, an auto-focus (AF) mode switch for selecting an AF mode is provided at a focus demand and, for example, a continuous AF mode is selected by the AF mode switch. Then, a CPU switches the continuous AF to a manual focus (MF) when an operation of the focus demand is executed and switches the MF to the continuous AF when an AF start switch provided at the focus demand is turned ON. Thus, when an operation of the MF is executed during focus adjustment by the AF, the focus adjustment by the AF is switched to focus adjustment by the MF, and thereafter, the focus adjustment by the MF is never switched to the focus adjustment by the AF unless the AF start switch is turned ON.

3 Claims, 12 Drawing Sheets

LENS SYSTEM

BACKGROUND OF THE INVENTION

1. Field of the Invention

The present invention relates to a lens system, and in particular, to a lens system in which focus adjustment of a taking lens can be switched between manual focus adjustment and auto-focus adjustment.

2. Description of the Related Art

Focus adjustment of a camera lens includes auto-focus (AF) with which focusing on a subject is executed automatically and manual focus (MF) with which an operator operates an operation member to execute focusing on a subject. Various systems are known as the AF. In particular, AF of a contrast system is generally used in a video camera for consumer use, a television camera for broadcast, or the like. For example, a high-frequency component is extracted from a video signal obtained by an image pickup element and the high-frequency component is integrated within an AF object area (focus area), whereby an integrated value is found. This integrated value indicates a sharpness (high and low of a contrast) of an image. A camera lens is focused on the subject within the focus area by executing focus adjustment such that the integrated value becomes largest (maximal). The integrated value is referred to as a focus evaluation value in this specification.

Usually, the AF and MF are switched by a predetermined mode changeover switch. In general, in the video camera for consumer use, an AF mode or an MF mode is selected by the mode changeover switch, whereby focus adjustment can be executed with the AF or the MF.

On the other hand, in the television camera for broadcast, it is impossible to execute focus adjustment only with the AF entirely. Japanese Patent Application Publication No. 8-29665 discloses a focus adjustment method which makes it possible to execute focus adjustment in accordance with an operation of the MF when an operator executes the operation of the MF even if a camera is in the AF mode. According to this method, there is an advantage that, for example, in the case where a subject focused on with the AF is not a subject which the operator desires, focus can be immediately corrected according to the operation of the MF by the operator.

In Japanese Patent Application Publication No. 8-29665, although processing of the AF is resumed after the operation of the MF is stopped, at this point, there are two cases that are taken into account: the case where focus is prohibited from moving with the AF even if a focus evaluation value has not reached a peak point unless a state of a subject changes; and the case where focus is moved to the peak point by the AF when the focus evaluation value is not the peak point even if a state of the subject does not change.

The former case is particularly effective in the case where a camera lens is intentionally made unfocused by the MF, the case where a camera lens is focused on a subject, which is not judged as focused by the AF, by the MF, and the like.

On the other hand, the latter case is particularly effective, in the case where there are a plurality of subjects on which a camera lens can be possibly focused on at different distances from the camera (i.e., in the case of a picture in which a focus evaluation value indicates the peak value in a plurality of focus positions), when an operator desires to change a subject on which the camera lens is focused by the AF. For example, in the case where the camera lens is not focused on a target subject by the first AF, the camera lens is focused on the target subject by the MF. In this case, even if focusing is not executed accurately, focus moves such that a focus evaluation point becomes the peak point by processing of the AF when an operation of the MF stops and the camera lens is accurately focused on the target subject. In the above-described AF of the contrast system, a so-called mountain-climbing system is adopted with which, in general, focus is moved in a direction in which a focus evaluation value increases to find a peak point of the focus evaluation value, and the focus is stopped in a position of the peak point. Thus, if the focus is moved to the vicinity of the peak point of a mountain-shape distribution of focus evaluation values formed by a target subject, the focus moves to the peak point of the mountain-shape distribution with the AF after the MF and the camera lens is focused on the subject.

Conventionally, focus adjustment is often executed by the MF in the television camera for broadcast. Thus, it has been proposed that a television camera which is premised on focus adjustment in the MF mode, processing of the AF is automatically started after an operation of the MF stops and the television camera is focused only once (so-called one-shot AF) and, thereafter, it returns to the MF (e.g., see Japanese Patent Application Publication No. 62-187829).

In the focus adjustment method as proposed in Japanese Patent Application Publication No. 8-29665, in the case where the conventional AF of the contrast system is adopted, there is a problem in that it is hard to show the effect as described above. That is, in the case where focus is stopped unless a state of a subject changes after an operation of the MF stops, whether or not the state of the subject has changed is judged according to a change in a focus evaluation value. However, if there is a change in illumination or flicker, since a focus evaluation value changes even if a state of a subject changes, there is an inconvenience in that focus moves due to the AF and cannot be kept stopped in a position to which the focus has moved by the operation of the MF. In the case where, after an operation of the MF stops, focus is moved to a peak point by the AF when a focus evaluation value is not the peak point, it is necessary to judge whether or not the focus evaluation value is the peak point and to judge an increasing direction of the focus evaluation value if it is judged that the focus evaluation value is not the peak point. Thus, for example, it is necessary to execute an operation, so-called wobbling, for determining a change in a focus evaluation value by moving focus back and forth, and there is a disadvantage that switching from the MF to the AF becomes unnatural. There is also a disadvantage that an unexpected situation tends to occur, for example, a focus evaluation value fluctuates due to a change in illumination or flicker even if a state of a subject does not change and a camera lens is not focused on the subject.

In the method which was proposed in the past concerning focus adjustment using both the AF and the MF, there is a problem in that it is inconvenient for an operator who wishes to execute focus adjustment mainly using the MF and using the AF supportively. That is, troublesome labor is required in that the operator usually sets the MF mode to execute focus adjustment with the MF, and for example, in the case where the operator wishes to use the AF only for a short time, after switching to the AF mode once to execute the AF, it is necessary to switch the AF mode to the MF mode again. In the case of Japanese Patent Application Publication No. 62-187829, the AF can be used supportively without any labor. However, in this case, it is an object to execute focusing of a higher accuracy, which cannot be confirmed by a viewfinder, with the AF as opposed to focusing with the MF of the operator. In this form, continuous AF (AF continuously actuating the AF as opposed to the one-shot AF is referred to as continuous AF) cannot be executed. Final focus adjustment cannot be executed with the MF either in the combination of the AF and the MF. For example, this form cannot cope with the case where the operator wishes to mainly use the MF and use the continuous AF only for a short time, the case where the operator wishes to make a camera unfocused intentionally during the continuous AF, the case where focus is corrected with the MF if a moving subject is tracked by the continuous AF and a camera lens is unfocused largely, and the like.

SUMMARY OF THE INVENTION

The present invention has been devised in view of such circumstances, and it is an object of the present invention to provide a lens system which can execute focus adjustment preferably with the AF and the MF. In particular, it is an object of the present invention to provide a lens system which can execute switching of focus adjustment with the continuous AF and the MF preferably in the case where an operator wishes to use the continuous AF for a short time and execute focus adjustment mainly with the MF, the case where an operator wishes to reflect focus adjustment of the MF preferentially on an image such as making a camera unfocused on a subject intentionally during the continuous AF, and the like.

In order to attain the above-described objects, the present invention is directed to a lens system which is adapted to allow manual focus adjustment for manually executing focus adjustment of a taking lens by manually operating an operation member and auto-focus adjustment for automatically executing focus adjustment of the taking lens according to information concerning a subject of shooting, the lens system comprising: an AF instruction device through which start of continuous execution of the auto-focus adjustment is instructed; an AF execution device which continuously executes the auto-focus adjustment when the start of continuous execution of the auto-focus adjustment is instructed through the AF instruction device; and a first focus adjustment switching device which, when the operation member for the manual focus adjustment is operated in a case where the auto-focus adjustment is continuously executed by the AF execution device, switches focus adjustment of the taking lens from the auto-focus adjustment to the manual focus adjustment and keeps the manual focus adjustment with the operation member effective until start of continuous execution of the auto-focus adjustment is instructed through the AF instruction device.

According to the present invention, if an operation of the manual focus adjustment (MF) is executed when the auto-focus adjustment (AF) is continuously executed, focus adjustment is executed by the MF, which is thereafter never switched to the AF unless start of execution of the AF is instructed. Therefore, for example, the present invention is effective in the case where an operator wishes to use the continuous AF for a short time only and switch the continuous AF to the MF or the case where an operator wishes to reflect the focus adjustment of the MF on an image such as making a camera unfocused on a subject intentionally during the continuous AF.

Preferably, the lens system further comprises: a second focus adjustment switching device which, when the operation member for the manual focus adjustment is operated in the case where the auto-focus adjustment is continuously executed by the AF execution device, switches the focus adjustment of the taking lens from the auto-focus adjustment to the manual focus adjustment to make the manual focus adjustment with the operation member effective and, when the operation member becomes not operated, automatically switches the focus adjustment of the taking lens from the manual focus adjustment to the auto-focus adjustment by the AF execution device; and a choosing device through which one from the first and second focus adjustment switching devices is chosen to execute the switch of the focus adjustment.

According to the present invention, since a first mode in which the continuous AF is started by a predetermined instruction device after an operation of the AF is stopped and a second mode in which the continuous AF is automatically started after an operation of the MF is stopped are made selectable, a preferred mode can be selected according to a purpose of use of the AF and the MF. For example, in the case where the continuous AF is mainly used and focus adjustment is executed by the MF if necessary (in the case where, when a camera lens is unfocused largely due to the continuous AF, this is corrected by the MF), the second mode is preferable because the focus adjustment automatically returns to the continuous AF after an operation of the MF is stopped in the second mode.

For example, the auto-focus adjustment is of a contrast system using video signals obtained by picking up images through the taking lens with a plurality of image pickup surfaces arranged in positions with different optical path lengths.

The present invention is also directed to a lens system which is adapted to allow manual focus adjustment for manually executing focus adjustment of a taking lens by manually operating an operation member and auto-focus adjustment for automatically executing focus adjustment of the taking lens, the auto-focus adjustment being of a contrast system using video signals obtained by picking up images through the taking lens with a plurality of image pickup surfaces arranged in positions with different optical path lengths, the lens system comprising: a first focus adjustment switching device which, when the operation member for the manual focus adjustment is operated in a case where the auto-focus adjustment is continuously executed, switches focus adjustment of the taking lens from the auto-focus adjustment to the manual focus adjustment to make the manual focus adjustment with the operation member effective and, when the operation member becomes not operated, automatically switches the focus adjustment of the taking lens from the manual focus adjustment to the auto-focus adjustment.

Preferably, the lens system further comprises: an AF instruction device through which start of continuous execution of the auto-focus adjustment is instructed; an AF execution device which continuously executes the auto-focus adjustment when the start of continuous execution of the auto-focus adjustment is instructed through the AF instruction device; a second focus adjustment switching device which, when the operation member for the manual focus adjustment is operated in the case where the auto-focus adjustment is continuously executed by the AF execution device, switches focus adjustment of the taking lens from the auto-focus adjustment to the manual focus adjustment and keeps the manual focus adjustment with the operation member effective until start of continuous execution of the auto-focus adjustment is instructed through the AF instruction device; and a choosing device through which one from the first and second focus adjustment switching devices is chosen to execute the switch of the focus adjustment.

According to the present invention, since an optical path length difference system is adopted as the system of auto-focus adjustment, a focus state can be determined accurately even if a focus evaluation value fluctuates due to a change in illumination, flicker, or the like, and a camera can be focused on a target subject by a stable auto-focus operation without malfunction. An operation called wobbling for judging whether or not a camera is in a focused state becomes unnecessary, and switching from the MF to the AF is executed smoothly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a lens system in accordance with the present invention will be hereinafter described in detail with reference to the accompanying drawings.

Figure 1:
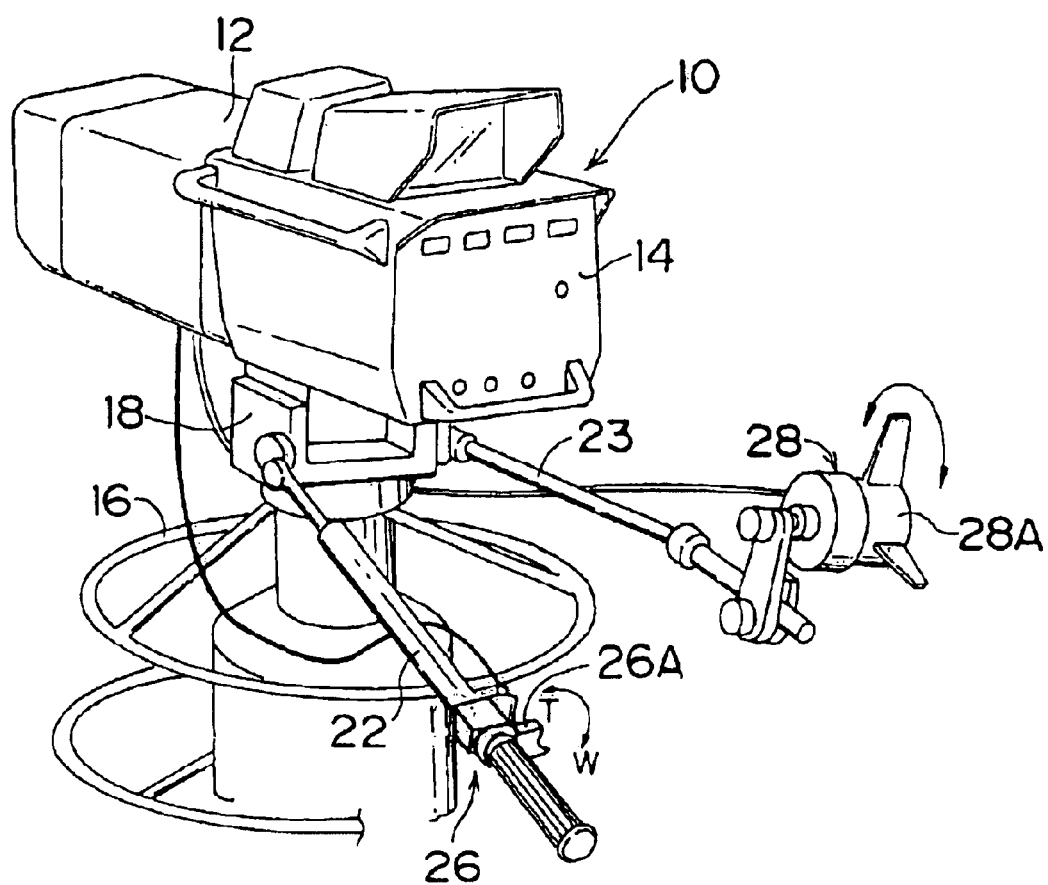
FIG. 1 is a perspective view of an embodiment of a television camera system in which a lens system in accordance with the present invention is used.

FIG. 1 is a perspective view showing an embodiment of a television camera system in which the lens system in accordance with the present invention is used. As shown in the figure, a television camera 10 is constituted by a lens device 12 and a camera main body 14. The television camera 10 is supported by a pan head 18 on a pedestal dolly 16. Two operation rods 22 and 23 are extended from the pan head 18, and a zoom demand 26 and a focus demand 28, which are connected to the lens device 12 by cables, respectively, are attached to ends of the respective operation rods 22 and 23.

A thumb ring 26A which can pivot in both directions from a reference position is provided in the zoom demand 26. When the thumb ring 26A is operated to rotate, a zoom instruction signal corresponding to an operation amount (rotating direction and rotation amount) from the reference position is given to the lens device 12 from the zoom demand 26, and a zoom of the lens device 12 moves to a wide side or a television side.

A focus ring 28A which can freely pivot is provided in the focus demand 28. When this focus ring 28A is operated to rotate, a focus instruction signal corresponding to an operation amount (rotating direction and rotation amount) thereof is given to the lens device 12 from the focus demand 28, and a focus of the lens device 12 moves from a closest distance side to an infinity side.

Figure 2:
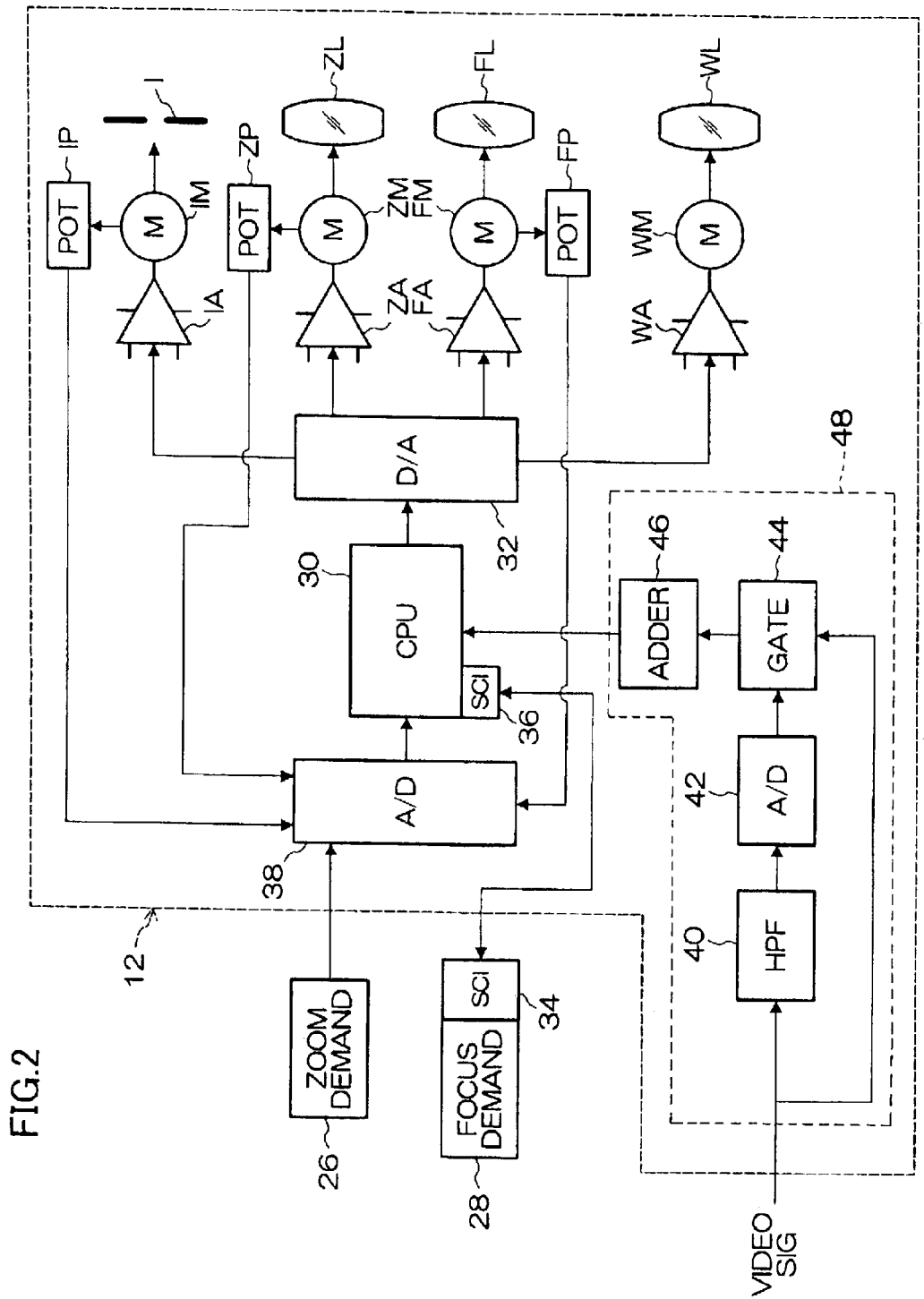
FIG. 2 is a block diagram showing an overall structure of the lens system in accordance with the present invention.

FIG. 2 is a block diagram showing an overall structure of the lens system in accordance with the present invention. In the lens system shown in the figure, for example, a focus lens (group) FL, a zoom lens (group) ZL, an iris I, a wobbling lens (group) WL, and the like, which are well known, are arranged in a shooting optical system (taking lens) of the lens device 12. Subject light incident on the shooting optical system is focused on an image pickup element surface of the camera main body 14.

The lenses FL, ZL, and WL, and the iris I are driven by a motor for focus FM, a motor for zoom ZM, a motor for wobbling WM, and a motor for iris IM corresponding thereto, respectively (each lens moves in an optical axis direction, and an opening amount of the iris I changes). The motors FM, ZM, WM, and IM are driven by an amplifier for focus FA, an amplifier for zoom ZA, an amplifier for wobbling WA, and an amplifier for iris IA, respectively, in accordance with drive signals which are given via a D/A converter 32 from a CPU 30 incorporated in the lens device 12.

On the other hand, the focus demand 28 and the CPU 30 can exchange various signals according to communication through serial communication interfaces (SCI) 34 and 36. For example, a focus instruction signal based upon a rotation operation of the focus ring 28A and switch information of an AF mode switch, an AF start switch, and the like, details of which will be discussed later, are given to the CPU 30 from the focus demand 28. The rotation of the focus ring 28A is determined, for example, as a pulse signal for each fixed rotation amount by an incremental rotary encoder. The pulse signal is counted by a counter which is reset properly. A value counted by the counter indicates an amount of movement from a set position of the focus lens FL at the time of resetting the counter to a set position of the focus lens FL to be instructed as a target position.

In a state in which focus adjustment by manual focus (MF) is valid as described later, the CPU 30 executes processing of the MF according to the focus instruction signal given from the focus demand 28. That is, according to the focus instruction signal given from the focus demand 28 and a position signal indicating a current position of the focus lens FL given from a potentiometer FP for focus via an A/D converter 38, the CPU 30 gives a drive signal for driving the motor for focus FM to the amplifier for focus FA via the D/A converter 32 as described above and moves the focus lens FL to the target position instructed by the focus instruction signal.

A zoom instruction signal for instructing a moving speed (target speed) of the zoom lens ZL corresponding to a rotation amount of the thumb ring 26A is given to the CPU 30 from the zoom demand 26 via the A/D converter 38. The zoom demand 26 may be adopted to exchange various signals with the CPU 30 by communication in the same manner as the focus demand 28. According to the zoom instruction signal given from the zoom demand 26 and a position signal indicating a current position of the zoom lens ZL given from a potentiometer for zoom ZP via the A/D converter 38, the CPU 30 gives a drive signal for driving the motor for zoom ZM to the amplifier for zoom ZA via the D/A converter 32 as described above and moves the zoom lens ZL at the target speed instructed by the zoom instruction signal.

Concerning the iris I, in general, an iris instruction signal for instructing a set position (stop value) of the iris I is given to the camera main body 14 from the CPU 30. The CPU 30 outputs a drive signal for driving the motor for iris IM to the amplifier for iris IA such that the stop value instructed by the instruction signal is obtained while determining a rotation position of the motor for iris IM as a set position of the iris I with the potentiometer for iris IM in the same manner as described above.

On the other hand, concerning the wobbling lens WL, a drive signal is not outputted according to an instruction signal from the outside but a drive signal for wobbling at the time of auto-focus discussed later is outputted to the amplifier for wobbling WA from the CPU 30. The motor for wobbling WM is, for example, a pulse motor, for which a potentiometer for feeding back a position of the wobbling lens WL is not installed.

Other than the processing of the MF, the CPU 30 also executes processing of the auto-focus (AF) for automatically moving the focus lens FL to a focus position according to information about a subject.

Here, in this lens system, a focus evaluation value determination circuit 48, which obtains a video signal (luminance signal) for picture display from the camera main body 14 and determines a focus evaluation value for evaluating a degree of focus according to the video signal, is mounted, for example, in the lens device 12. The video signal obtained from the camera main body 14 is, for example, a video signal of the NTSC system which is obtained by picking up a subject image focused by the shooting optical system with an image pickup element of the camera main body 14. The focus evaluation value is a value indicating a level (sharpness) of a contrast of an image, and a method of determining the focus evaluation value has been well known conventionally in the field of the AF of the contrast system.

FIG. 2 shows a structure of the focus evaluation value determination circuit 48. First, only a high-frequency component is extracted from a video signal obtained from the camera main body 14 by a high-pass filter (HPF) 40 and is converted into a digital signal by the A/D converter 42. Then, only signals, which are within a predetermined focus area set in a shooting range, in the high-frequency component converted into the digital signal are extracted by a gate circuit 44. The signal of the high-frequency component extracted by the gate circuit 44 are integrated by an adder circuit 46 for each field. A signal obtained by the integration of the adder circuit 46 is read by the CPU 30 as the focus evaluation value indicating a degree of focus with respect to a subject in the focus area (level of a contrast). A method of determining a focus evaluation value from a video signal is not limited to the above-mentioned case.

In the case where the processing of the AF is executed, a drive signal for driving the motor for focus FM is generated by the CPU 30 according to the focus evaluation value and is outputted to the amplifier for focus FA to move the focus lens FL to a focus position as in the case of the MF. More specifically, the CPU 30 properly outputs a drive signal for driving the motor for wobbling WM to the amplifier for wobbling WA via the D/A converter 32 and obtains a focus evaluation value from the focus evaluation value determination circuit 48 (adder circuit 46) while moving the wobbling lens WL back and forth in an optical axis direction (wobbling) (e.g., obtains the focus evaluation value for each field). Consequently, a focus position of the shooting optical system moves back and forth, and a focus evaluation value equivalent to that in the case where the focus lens FL is moved back and forth from a current set position is determined. The CPU 30 judges whether or not a focus evaluation value is maximal in the current position of the focus lens FL according to the focus evaluation value obtained during the wobbling. If the focus evaluation value is maximal, the focus lens FL has been focused and is stopped in the focus position. On the other hand, in the case where the focus evaluation value is not maximal, the CPU 30 judges whether a focus position is farther in an infinite direction or in a closest distance direction, that is, judges a direction in which the focus evaluation value increases, from a size relationship of focus evaluation values obtained during the wobbling. Then, the CPU 30 outputs a drive signal to the amplifier for focus FA to move the focus lens FL in the judged direction. In this way, by repeating the wobbling of the wobbling lens WL and the movement of the focus lens FL, the focus lens FL is automatically set in a focus position.

Figure 3:
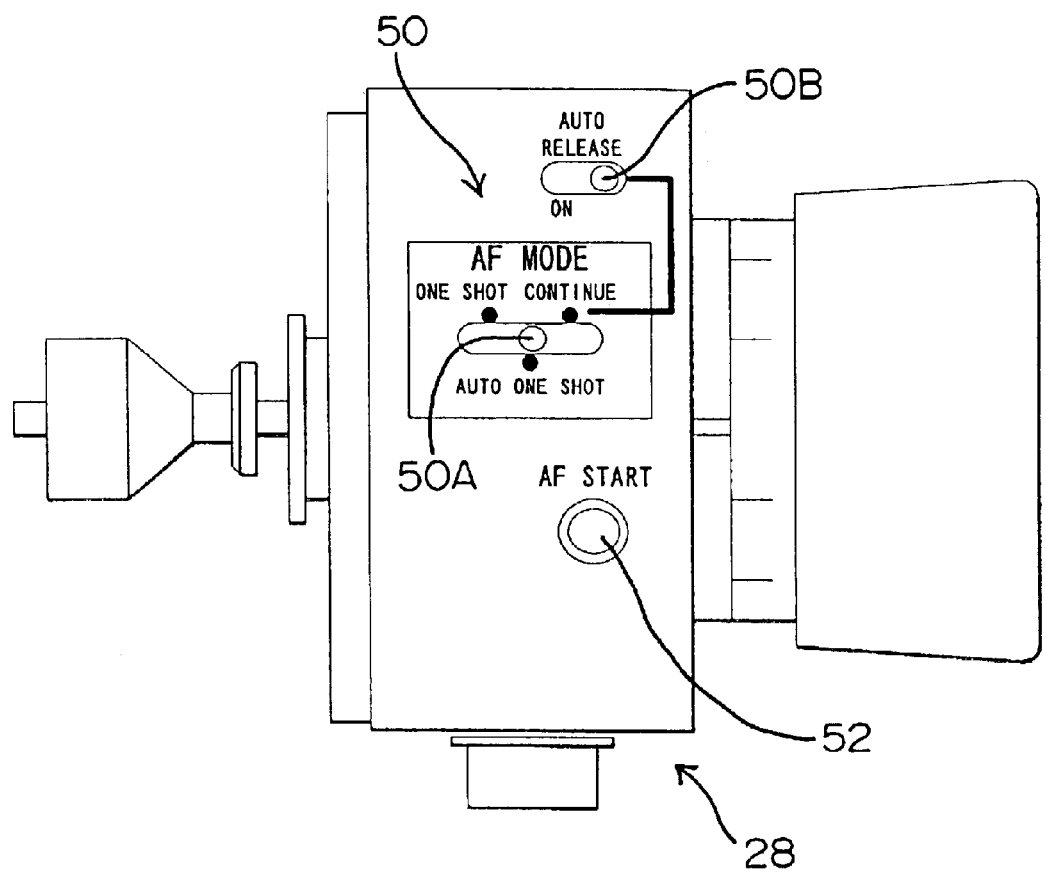
FIG. 3 is a view showing a structure of a switch installed in a focus demand.

Next, the AF mode will be described. As shown in FIG. 3, an AF mode switch 50 for selecting an AF mode and an AF start switch 52 for instructing start of processing of the AF are provided in the focus demand 28. The CPU 30 reads the AF mode selected by the AF mode switch and ON/OFF of the AF start switch according to switch information given from the focus demand 28 and changes contents of processing of the AF and contents of processing such as switching from the MF to the AF according to the AF mode. In a predetermined AF mode, the CPU 30 determines that the AF start switch 52 has been turned ON and starts the processing of the AF.

More specifically, the AF mode switch 50 is constituted by two slide switches, namely, a main switch 50A and a sub-switch 50B. Any one of the one-shot AF mode, the automatic one-shot AF mode, and the continuous AF mode can be selected by the main switch 50A. In the case where the continuous AF mode is selected by the main switch 50A, a manual continuous AF mode or an automatic continuous AF mode can be further selected by the sub-switch 50B. That is, any one of the one-shot AF mode, the automatic one-shot AF mode, the continuous AF mode, and the automatic continuous AF mode can be selected by the AF mode switch 50. For example, the AF mode switch 50 may be constituted by one slide switch having four selection points or may take other switch forms.

Each AF mode will be described. Basically, in any AF mode, an operation of the MF is given priority. For example, even in the case where the AF is executed in each AF mode (in the case where processing of the AF is continuing), when the focus ring 28A of the focus demand 28 is operate, the MF becomes valid, and the processing of the MF is executed by the CPU 30 according to a focus instruction signal from the focus demand 28. On the other hand, contents of processing of the AF and contents of processing of switching from the MF to the AF are different in each mode.

In the one-shot AF mode, the AF is started when the AF start switch 52 is turned ON. The AF start switch 52 is an automatic return switch which is OFF usually. Further, the one-shot AF mode is a mode in which, when the focus lens FL is set in a focus position once by the AF, the AF ends and is switched to the MF automatically. That is, in the one-shot AF mode, the AF is not started unless an operator turns on the AF start switch 52, and the AF ends upon focusing the focus lens FL once and is not continuously executed.

In the automatic one-shot AF mode, the AF start switch 52 is not used, and when the focus ring 28A of the focus demand 28 is operated to execute focus adjustment with the MF, the AF is automatically started at a point when the operation stops. Then, when the focus lens FL is set in a focus position once by the AF, the AF ends and is switched to the MF. That is, the automatic one-shot AF mode is different from the one-shot AF mode in that, when an operator executes an operation of the MF (operation of the focus ring 28A), the MF is automatically switched to the AF after the operation stops. However, the automatic one-shot AF mode is the same as the one-shot AF mode in that the AF ends upon focusing the focusing lens FL once.

In the continuous AF mode, when the AF start switch 52 is turned ON, the AF is started, and thereafter, the processing of the AF is continuously executed (continuous AF) regardless of whether or not the focus lens FL is set in a focus position. Then, when an operation of the MF (operation of the focus ring 28A) is executed during execution of the processing of the continuous AF, the MF becomes valid and the focus lens FL is driven by the operation of the MF. If the AF is switched to the MF once in this way, thereafter, the MF is not switched to the AF and the processing of the MF continues unless the AF start switch 52 is turned ON. When the AF start switch 52 is turned ON, the MF is switched to the continuous AF as described above. This continuous AF mode is particularly effective in the case where an operator executes focus adjustment with the AF and wishes to switch the focus adjustment of the AF to focus adjustment of the MF. For example, it is preferable to select this continuous AF mode in the case where an operator wishes to make a subject unfocused during the AF and the case where an operator wishes to execute the AF for a short time and, thereafter, execute focus adjustment with the MF.

In the automatic continuous AF mode, the processing of the continuous AF is executed unless an operation of the MF is executed and, when the operation of the MF is executed during execution of the processing of the continuous AF, the focus lens FL is driven by the operation. Then, when the operation of the MF stops, the MF is automatically switched to the AF and the processing of the continuous AF is executed. That is, the automatic continuous AF mode is different from the continuous AF mode in that the processing of the continuous AF is executed even if the AF start switch 52 is not turned ON and, at the same time, when the operation of the MF stops, the MF is automatically switched to the processing of the continuous AF. This automatic continuous AF mode is effective, for example, in the case where, if the AF cannot completely track the subject and the focus lens FL is unfocused when a moving subject is tracked by the continuous AF, the focus of the AF is corrected by the MF and the case where the AF is used for a long time.

Figure 4:
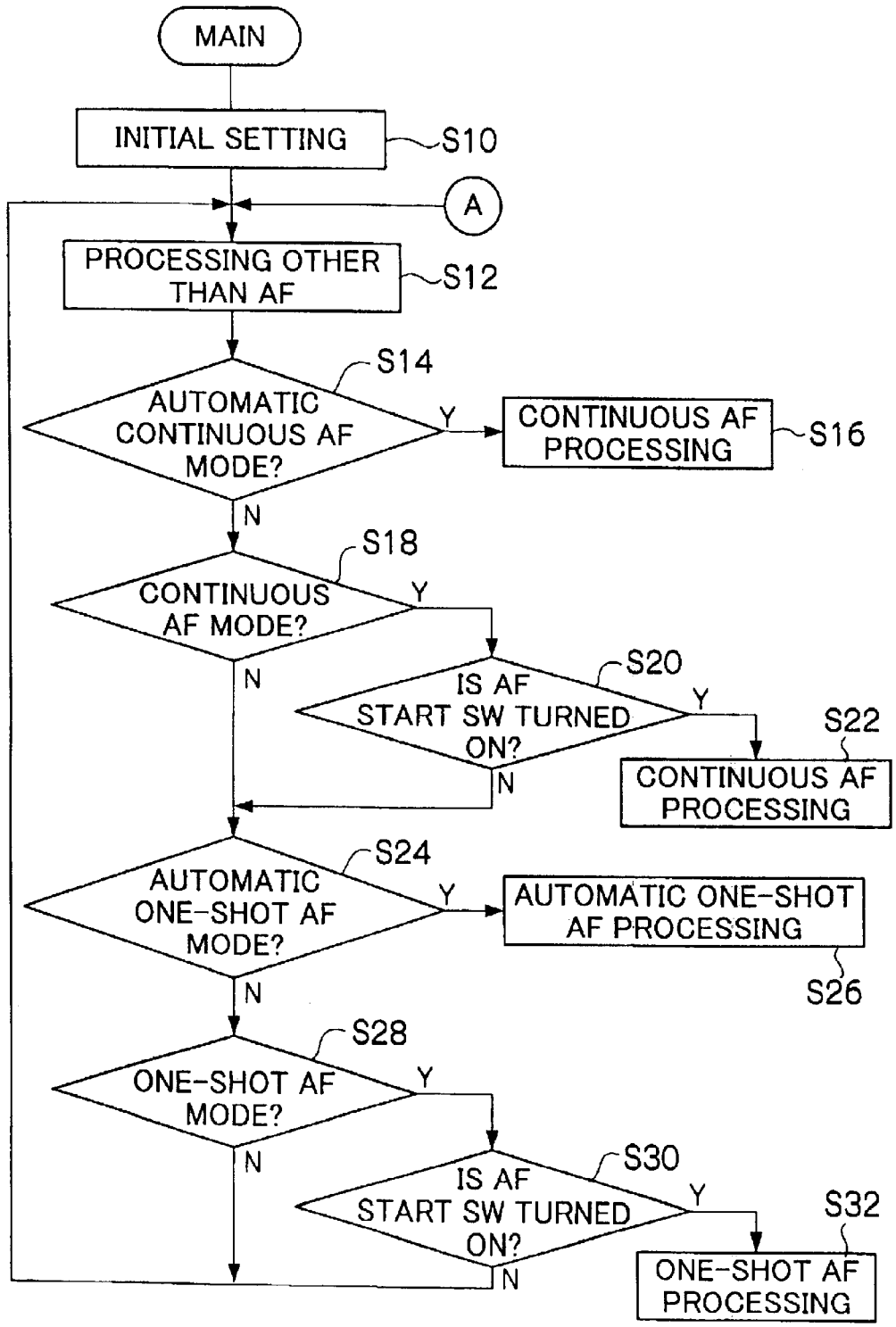
FIG. 4 is a flowchart showing processing procedures of a CPU concerning focusing.

Next, processing of the CPU 30 corresponding to the respective AF modes will be described using flowcharts of FIGS. 4 to 7. First, as shown in FIG. 4, after executing a predetermined initial setting (step S10), the CPU 30 executes processing other than the AF (step S12). The processing other than the AF includes processing of the MF and processing for driving an object other than a focus lens (zoom lens, etc.).

Next, the CPU 30 reads switch information from the focus demand 28 and judges whether or not an AF mode selected by the AF mode switch 50 is the automatic continuous AF mode (step S14). In the case where it is determined that the AF mode is the automatic continuous AF (YES in step S14), the CPU 30 executes the continuous AF (automatic continuous AF) processing (step S16).

Figure 5:
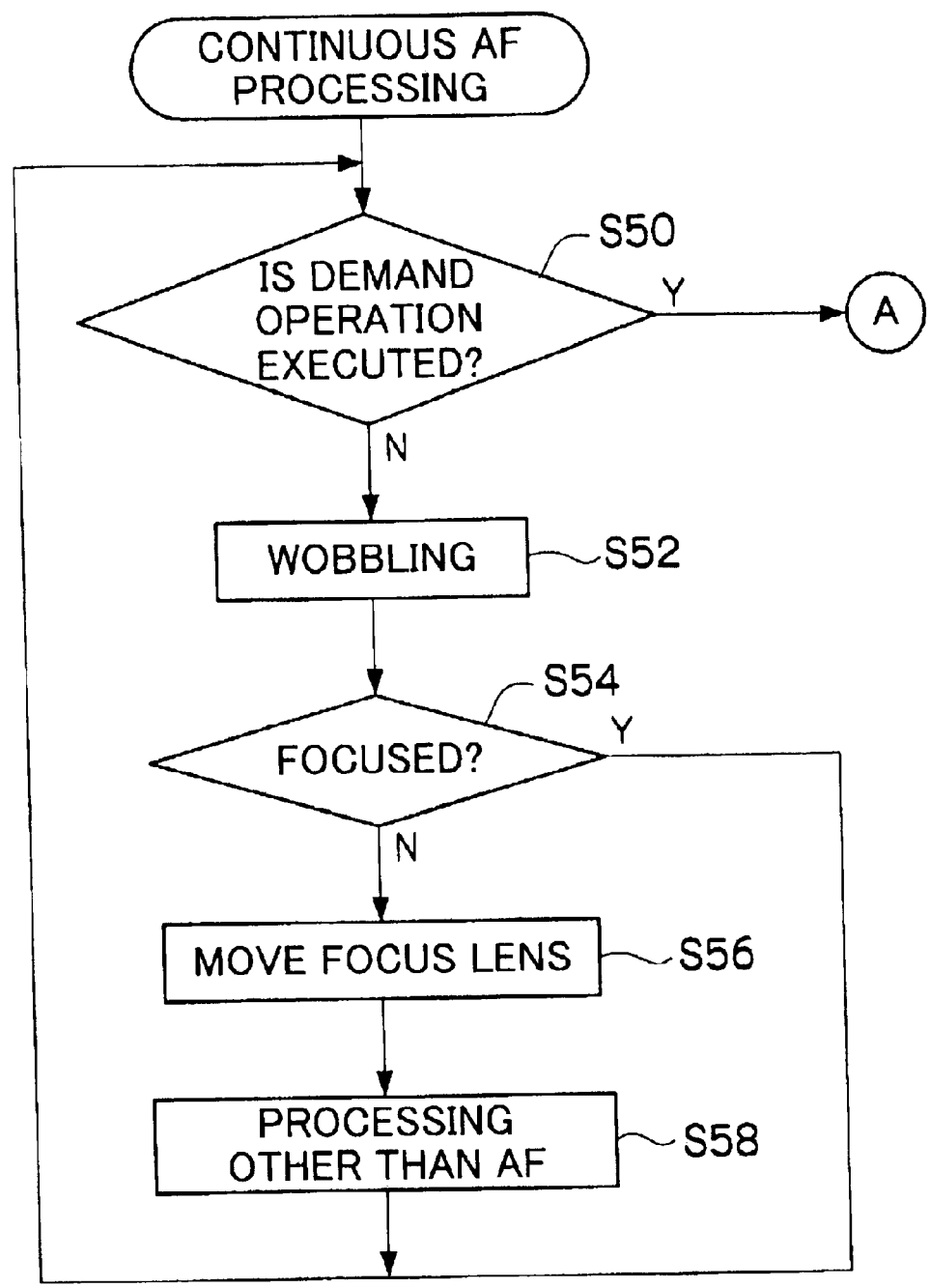
FIG. 5 is a flowchart showing processing procedures of a continuous AF mode.

In the continuous AF processing, as shown in the flowchart of FIG. 5, the CPU 30 judges whether or not an operation of the focus ring 28A of the focus demand 28 (hereinafter referred to as demand operation) is executed (step S50). In the case where it is judged that the demand operation is not executed (NO in step S50), the CPU 30 drives the wobbling lens WL to execute wobbling (step S52). In this case, the CPU 30 obtains a focus evaluation value from the focus evaluation value determination circuit 48, for example, for each field. Then, the CPU 30 judges whether or not the focus evaluation value is maximal in a current position of the focus lens FL, that is, whether or not the focus lens FL is focused according to a focus evaluation value obtained during the wobbling (step S54). Here, in the case where it is judged that the focus lens FL is not focused (NO in step S54), the CPU 30 moves the focus lens FL in a direction in which the focus evaluation value increases according to the focus evaluation value obtained during the wobbling (step S56). Then, the CPU 30 executes the processing other than the AF (step S58) and repeats the processing from step S50.

When executing the processing from step S50 to step S58 repeatedly, in the case where it is judged in step S54 that the focus lens FL is focused (YES in step S54), the CPU 30 repeats the processing from step S16 without executing the processing of steps S56 and S58. Consequently, the focus lens FL stops in a focus position and, at the same time, the wobbling is executed properly and it is judged whether or not the focus lens FL is focused. In the case where the focus lens FL becomes unfocused after it if focused once, the focus lens FL is driven again so as to be focused.

In the case where it is judged in step S50 that the demand operation is executed (YES in step S50), the CPU 30 returns to step S12 of the flowchart of FIG. 4. That is, while the demand operation is being executed, the CPU 30 executes the processing of the MF according to the demand operation in step 12.

In the case where it is judged in step S14 of the flowchart of FIG. 4 that the AF mode is not the automatic continuous AF mode (NO in step S14), next, the CPU 30 judges whether or not the AF mode selected by the AF mode switch 50 is the continuous AF mode (step S18). In the case where it is judged that the AF mode is the continuous AF mode (YES in step S18), subsequently, the CPU 30 judges whether or not the AF start switch 52 of the focus demand 28 is turned ON (step S20). Here, in the case where it is judged that the AF start switch 52 is turned ON (YES in step S20), the CPU 30 executes continuous AF processing with the same contents of processing as those described in FIG. 5 (step S22). On the other hand, in the case where it is judged in step S20 that the AF start switch 52 is not turned ON (NO in step S20), the CPU 30 shifts to step S24 without executing the continuous AF processing. That is, in the case of the continuous AF mode, the CPU 30 does not execute the processing of the AF unless the AF start switch 52 is turned ON.

In the case where it is judged in step S14 that the AF mode is not the automatic continuous AF mode (NO in step S14) or it is judged in step S20 that the AF start switch 52 is not turned ON (NO in step S20), next, the CPU 20 judges whether or not the AF mode selected by the AF mode switch 50 is the automatic one-shot AF mode (step S24). In the case where it is judged that the AF mode is the automatic one-shot AF mode (YES in step S24), the CPU 30 executes the automatic one-shot AF processing (step S26).

Figure 6:
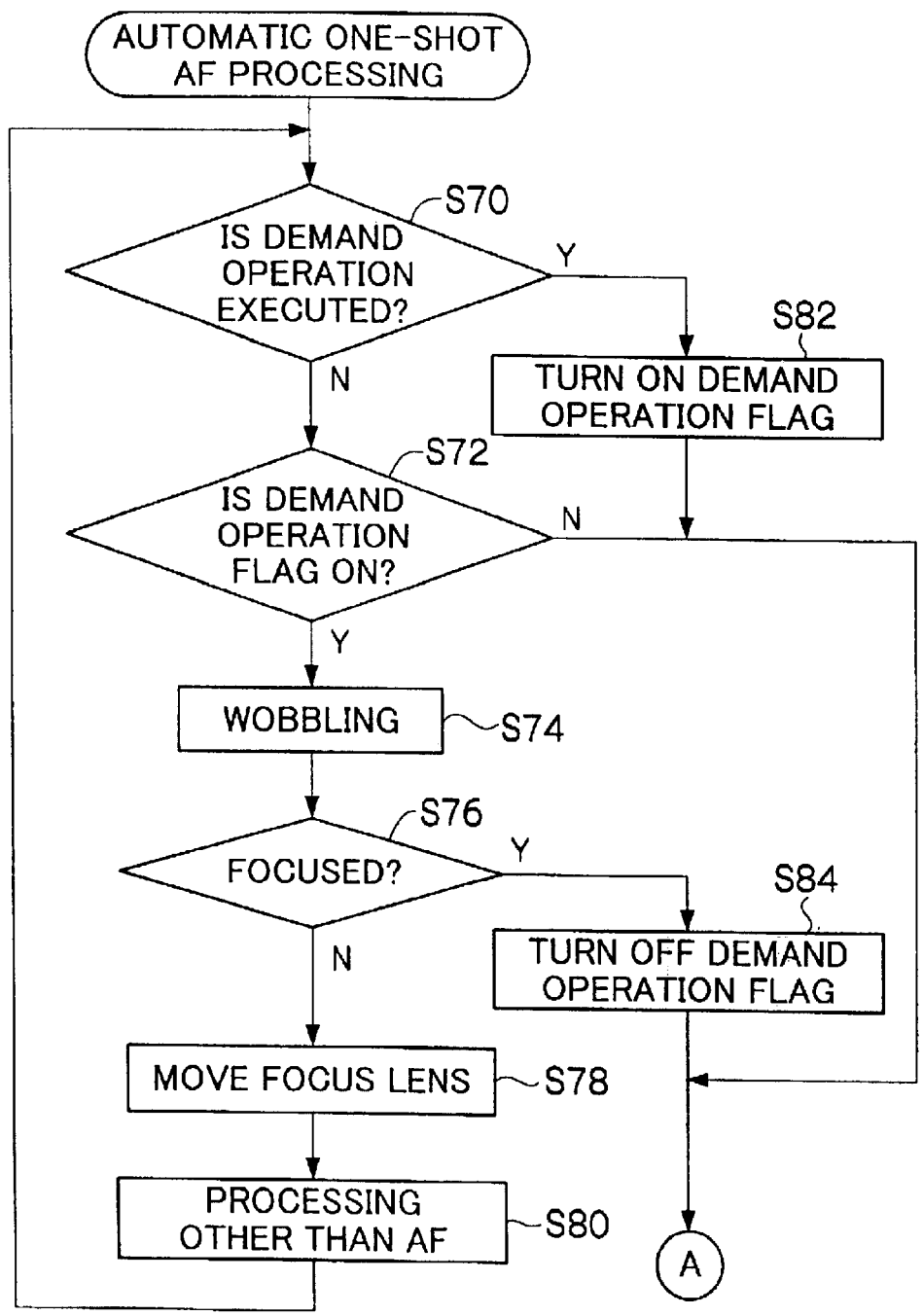
FIG. 6 is a flowchart showing processing procedures of an automatic one-shot AF mode.

In the automatic one-shot AF processing, as shown in the flowchart of FIG. 6, first, the CPU 30 judges whether or not the demand operation is executed (step S70). In the case where it is judged that the demand operation is not executed (NO in step S70), subsequently, the CPU 30 judges whether or not a demand operation flag is ON (step S72). The demand operation flag is turned ON when the demand operation is executed after focusing by the AF as described above. In the case where it is judged in step S72 that the demand operation flag is not ON (NO in step S72), the CPU 30 returns to step S12 of the flowchart of FIG. 4 without executing the processing of the AF. In the case where it is judged in step S72 that the demand operation flag is ON (YES in step S72), the CPU 30 drives the wobbling lens WL to execute wobbling (step S74). In this case, the CPU 30 obtains a focus evaluation value from the focus evaluation value determination circuit 48, for example, for each field. Then, the CPU 30 judges whether or not a focus evaluation value is maximal in a current position of the focus lens FL, that is, whether or not the focus lens FL is focused according to a focus evaluation value obtained during the wobbling (step S76). Here, in the case where it is judged that the focus lens FL is not focused (NO in step S76), the CPU 30 moves the focus lens FL in a direction in which the focus evaluation value increases according to the focus evaluation value obtained during the wobbling (step S78). Then, the CPU 30 executes the processing other than the AF (step S80) and repeats the processing from the step S70.

When executing the processing from step S70 to step S80 repeatedly, in the case where it is judged in step S76 that the focus lens FL is focused (YES in step S76), the CPU 30 turns OFF the demand operation flag (step S84) and returns to step S12 of the flowchart of FIG. 4. By turning OFF the demand operation flag in this way, it is judged in step S72 that the demand operation flag is not ON (NO in step S72), and the CPU 30 is prohibited from continuously repeating the processing of the AF without the demand operation.

On the other hand, in the case where it is judged in step S70 that the demand operation is executed (YES in step S70), the CPU 30 turns ON the demand operation flag (step S82) and returns to step S12 of the flowchart of FIG. 4. That is, the CPU 30 executes the processing of the MF according to the demand operation and, at the same time, in the case where the demand operation stops, it is judged in step S70 that the demand operation is not executed (NO in step S70) and judges in step S72 that the demand operation flag is ON (YES in step S72), and the processing of the AF is executed.

In the case where it is judged in step S24 of the flowchart of FIG. 4 that the AF mode is not the automatic one-shot mode (NO in step S24), next, the CPU 30 judges whether or not the selected AF mode is the one-shot AF mode with the AF mode switch 50 (step S28). In the case where it is judged that the AF mode is the one-shot AF mode (YES in step S28), subsequently, the CPU 30 judges whether or not the AF start switch 52 of the focus demand 28 is turned ON (step S30). Since it is always judged in the judgment processing of step S28 that the AF mode is the one-shot AF mode (YES in step S28), the judgment processing of step S28 is unnecessary. However, the judgment processing of step S28 is added for convenience of explanation in order to clarify a type of the AF mode. In the case where it is judged in step S30 that the AF start switch is ON (YES in step S30), the CPU 30 executes the one-shot AF processing (step S32). On the other hand, in the case where it is judged in step S28 that the AF mode is not the one-shot AF mode (NO in step S28) or it is judged in step S30 that the AF start switch 52 is not ON (NO in step S30), the CPU 30 returns to step S12 without executing the one-shot AF processing. That is, in the case of the one-shot AF mode, the CPU 30 does not execute the processing of the AF unless the AF start switch 52 is turned ON.

Figure 7:
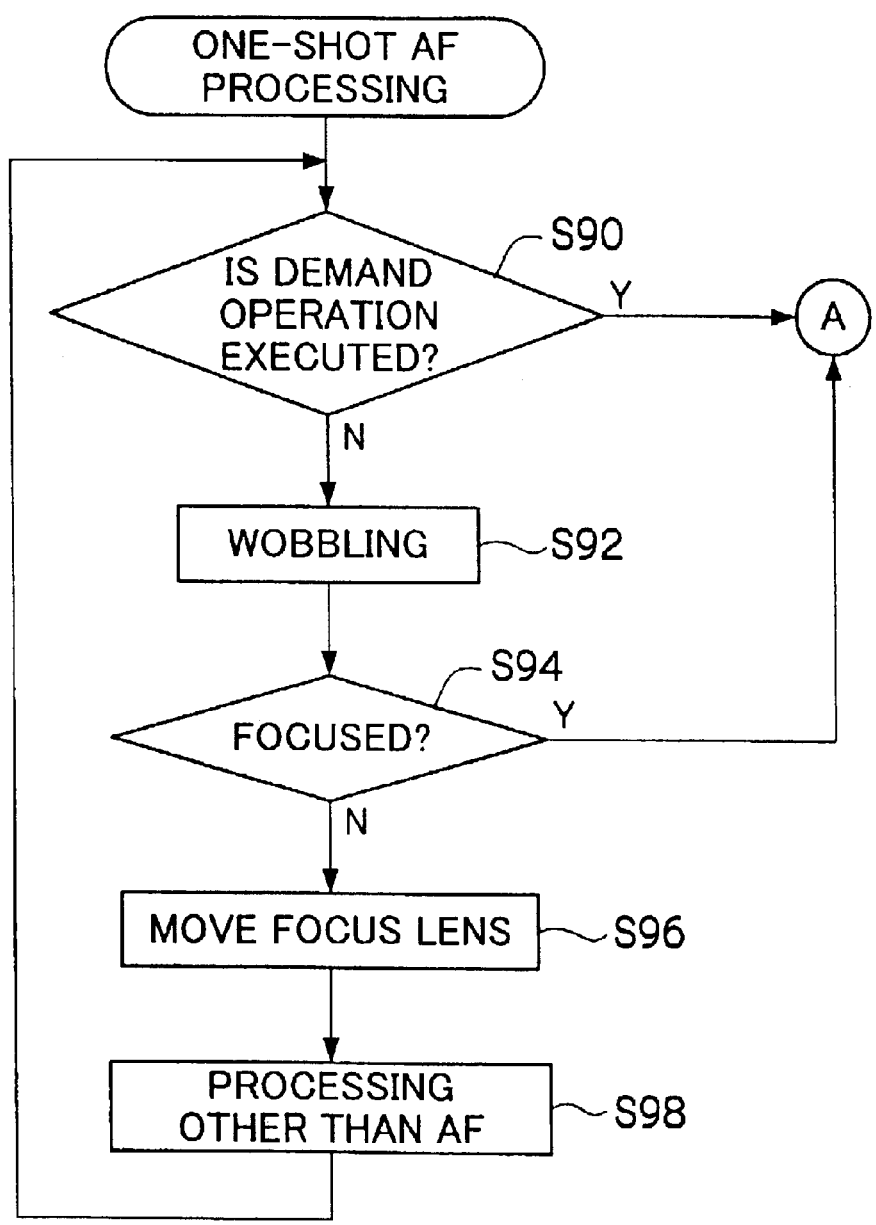
FIG. 7 is a flowchart showing processing procedures of a one-shot AF mode.

In the one-shot AF processing, as shown in the flowchart of FIG. 7, first, the CPU 30 judges whether or not the demand operation is executed (step S90). In the case where it is judged that the demand operation is not executed (NO in step S90), the CPU 30 drives the wobbling lens WL to execute wobbling (step S92). In this case, the CPU 30 obtains a focus evaluation value from the focus evaluation value determination circuit 48, for example, for each field. Then, the CPU 30 judges whether or not a focus evaluation value is maximal in a current position of the focus lens FL, that is, whether or not the focus lens FL is focused according to the focus evaluation value obtained during the wobbling (step S94). Here, in the case where it is judged that the focus lens FL is not focused (NO in step S94), the CPU 30 moves the focus lens FL in a direction in which the focus evaluation value increases according to the focus evaluation value obtained during the wobbling (step S96). Then, the CPU 30 executes the processing other than the AF (step S98) and repeats the processing from the step S90.

When executing the processing from step S90 to the step S98 repeatedly, in the case where it is judged in step S94 that the focus lens FL is focused (YES in step S98), the CPU returns to step S12 of the flowchart of FIG. 4. That is, in the case where the focus lens FL is focused once according to the processing of the AF, the CPU 40 switches the processing to the processing of the MF.

In the case where it is judged in step S90 that the demand operation is executed (YES in step S90), the CPU returns to step S12 of the flowchart of FIG. 4. That is, in the case where the demand operation is executed, the CPU 30 executes the processing of the MF according to the demand operation.

As described above, the AF mode switch 50 and the AF start switch 52 are provided in the focus demand 28 in the above-described embodiment. However, these switches may be provided anywhere, for example, it can be provided in the lens device 12, the zoom demand 26, the camera main body 14, and the like.

In the above-described embodiment, as the system of the AF, the contrast system is described which finds a focus evaluation value according to a video signal obtained by the image pickup element of the camera main body and sets a position of the focus lens FL such that the focus evaluation value becomes maximal. However, the present invention can also be applied to a contrast system described below or a system different from the contrast system.

For example, in the above-described embodiment, the CPU 30 judges whether or not a focus evaluation value is maximal in a current position of the focus lens FL by wobbling the wobbling lens WL. However, the present invention can be applied to the case where, without executing wobbling, the AF of a contrast system called an optical path length difference system is adopted which uses a plurality of image pickup elements arranged in position with different optical path lengths (all the image pickup elements may be dedicated for the AF or an image pickup element for generating a video signal of picture display may also be used as one of the plurality of image pickup elements for the AF). In the AF of the optical path length difference system, a focus evaluation value is found in the same manner as the above-described embodiment for each video signal according to a plurality of video signals obtained from the plurality of image pickup elements with different optical path lengths, and it is judged whether or not the focus lens FL is focused in a current position of the focus lens FL from a size relationship of the focus evaluation values and, in the case where the focus lens FL is not focused, it is judged whether or not a focus position is farther in an infinity direction or in a closest distance direction than the current position of the focus lens FL. Details of the AF of the optical path length difference system will be described later.

The present invention can also be applied to the case where an active system is adopted as a system of the AF. For example, in the active system, measurement light is irradiated on a subject from a light emitting section and the measurement light reflected by the subject is received by a light receiving section, whereby a distance to the subject can be measured from the principle of triangulation distance measurement, turn-around time of measurement light, or the like. Then, the focus lens is set in a position corresponding to the measured distance. A measurement wave used in the active system is not limited to light but may be an electric wave, a sound wave, or the like.

The present invention can be applied to the case where the AF is executed by combining both the contrast system and the active system.

Figure 8:
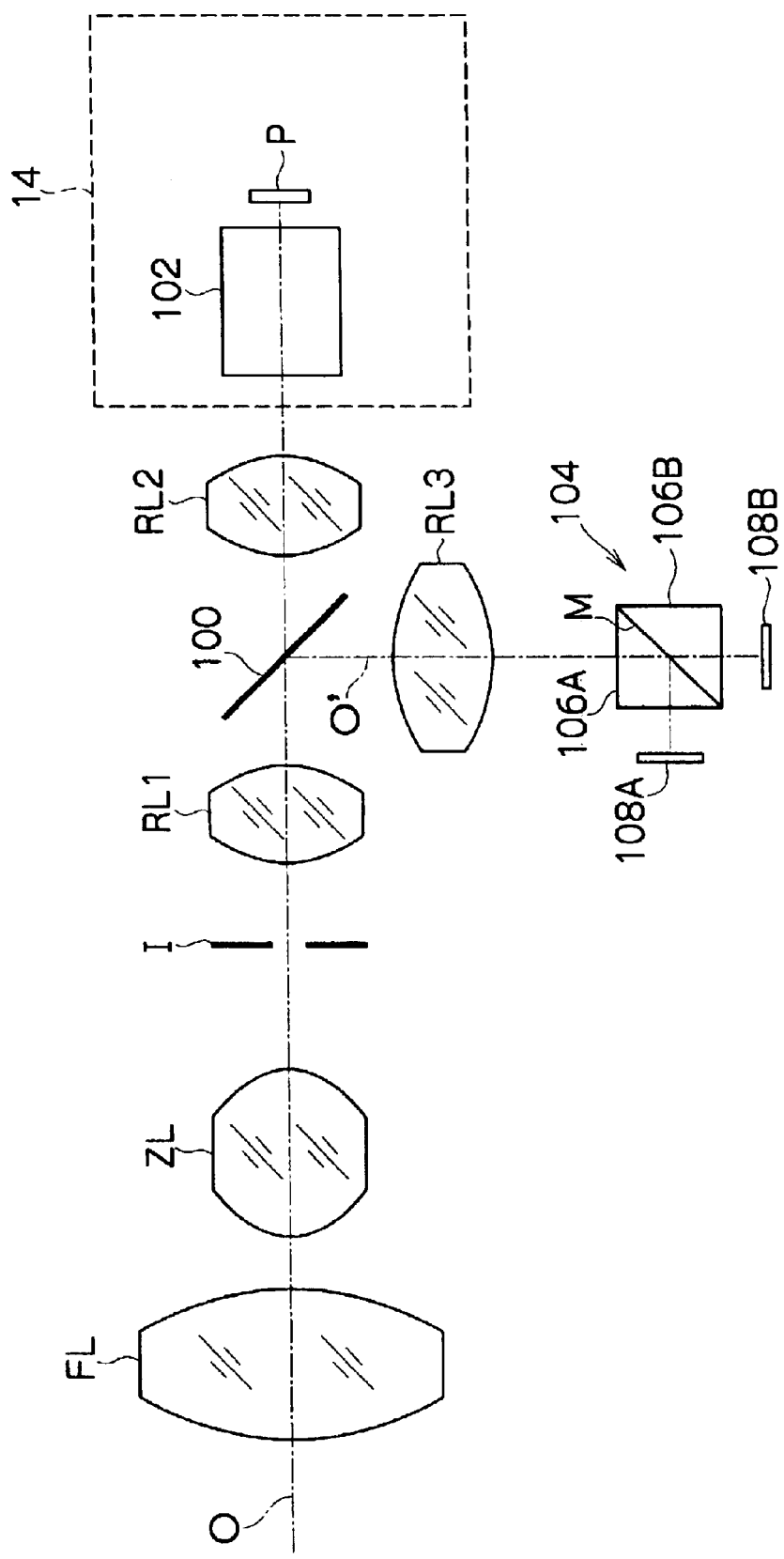
FIG. 8 is a diagram showing a structure of a taking lens in the case where an AF of an optical path length difference system is adopted.

Next, the AF of the optical path length difference system which is applicable as the AF of the lens system in accordance with the present invention will be described. FIG. 8 is a diagram showing a structure of an optical system (taking lens) in the case where the AF of the optical path length difference system is adopted. As in FIG. 2, a focus lens (group) FL, a zoom lens (group) ZL, an iris I, a relay lens (relay optical system) comprising a front side relay lens RL1 and a rear side relay lens RL2, and the like are arranged in the taking lens. Further, a semitransparent mirror 100 for branching subject light incident on the taking lens to an optical path for focus state determination is arranged between the front side relay lens RL1 and the rear side relay lens RL2 of the relay optical system.

The semitransparent mirror 100 is arranged to be inclined by approximately 45 degrees with respect to an optical axis O of the taking lens, so that a part of subject light (e.g., light amount of ⅓ of the subject light) which has passed through the front side relay lens RL1 is reflected at right angles as subject light for focus state determination to the optical path for focus state determination.

The subject light which has been transmitted through the semitransparent mirror 100 is emitted from a rear end side of the taking lens as subject light for picture (for obtaining a subject image) and, then, is incident on an image pickup section 102 of the camera main body 14. A description of a structure of the image pickup section 102 will be omitted. The subject light incident on the image pickup section 102 is dissolved into, for example, light of three colors, namely, red light, green light, and blue light by a color separation optical system and is incident on an image pickup surface of the image pickup element for picture for each color. Consequently, a color picture for broadcast is captured. A focus surface P in the figure indicates a position, which is optically equivalent to the image pickup surface of each image pickup element for picture, on an optical axis O of the taking lens.

On the other hand, the subject light reflected by the semitransparent mirror 100 travels on the optical path for focus state determination along an optical axis O' which is vertical with respect to the optical axis O as subject light for focus state determination (for AF) and is incident on the relay lens RL3. Then, the subject light is condensed by the relay lens RL3 and is incident on a focus state determination section 104.

The focus state determination section 104 is constituted by two prisms 106A and 106B forming a light dividing optical system and a pair of image pickup elements for focus state determination 108A and 108B (hereinafter referred to as image pickup elements for focus state determination 108A and 108B).

As described above, the subject light reflected by the semitransparent mirror 100 travels along the optical path O' and is incident on the first prism 106A. Then, the subject light is equally divided into reflected light and transmitted light on a semitransparent mirror surface M of the first prism 106A. The reflected light is incident on an image pickup surface of one image pickup element for focus state determination 108A and the transmitted light is incident on the other image pickup element for focus state determination 108B. For example, a light amount of ⅙ of light amount of total subject light incident on the taking lens is incident on the respective image pickup surfaces of the image pickup elements for focus state determination 108A and 108B.

Figure 9:
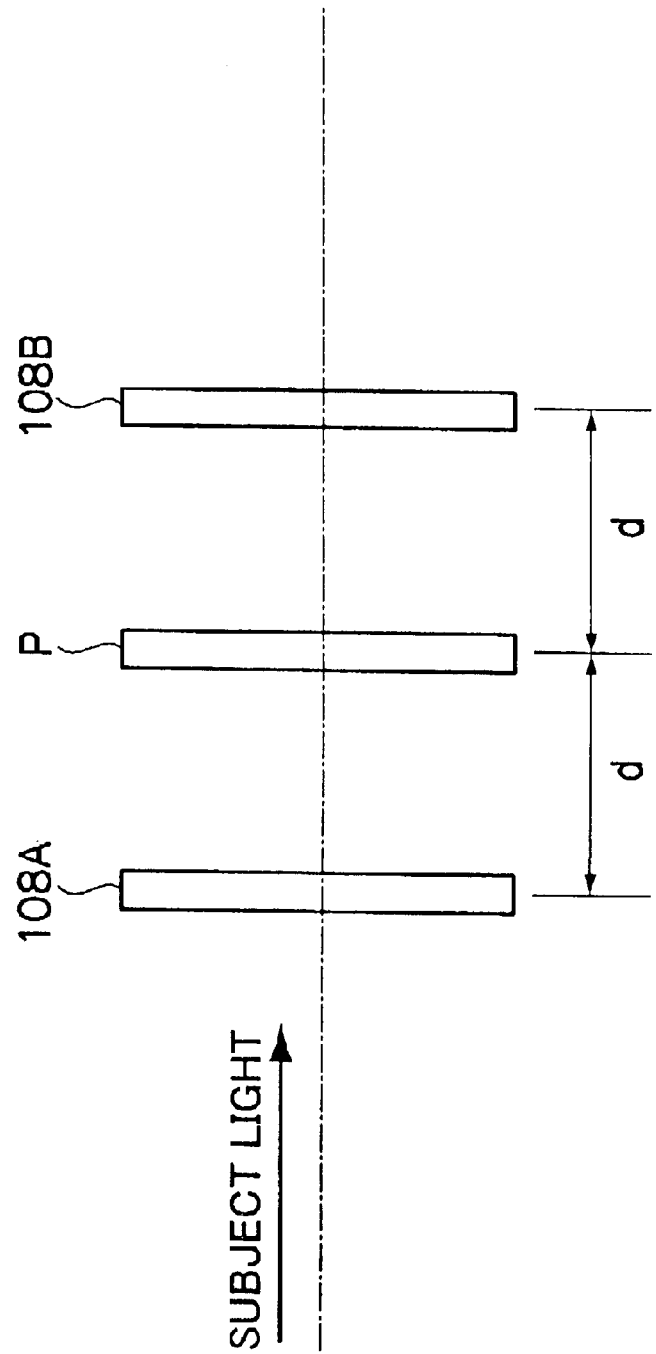
FIG. 9 is a diagram showing positions of respective image pickup elements with an optical axis of subject light incident on an image pickup element for picture of a camera main body and an optical axis of subject light incident on a pair of image pickup elements for focus state determination overlapped with each other on an identical straight line.

FIG. 9 is a diagram showing an optical axis of subject light incident on an image pickup element for picture of the camera main body 14 and an optical axis of subject light incident on the pair of image pickup elements for focus state determination 108A and 108B overlapped with each other on an identical straight line. As shown in the figure, an optical path length of the subject light incident on one image pickup element for focus state determination 108A is set shorter than an optical path length of the subject light incident on the other image pickup element 108B for focus state determination, and an optical path length of the subject light incident on the image pickup surface (focus surface P) of the image pickup element for picture is set to be a length in the middle of them. That is, (the image pickup surfaces of) the pair of image pickup elements for focus state determination 108A and 108B are arranged in positions at an equal distance (d) to the front and the back of the image pickup surface (focus surface P) of the image pickup elements for picture, respectively.

Therefore, the subject light for focus state determination branched by the semitransparent mirror 100 is used for image pickup in the positions at the equal distance (d) to the image pickup surface (focus surface P) of the image pickup element for picture by the pair of image pickup elements for focus state determination 108A and 108B. The image pickup elements for focus state determination 108A and 108B are for obtaining video signals for focus state determination (auto-focus control) and are not required to be one for picking up a color picture. In this embodiment, it is assumed to be a CCD for picking up black and white images.

Figure 10:
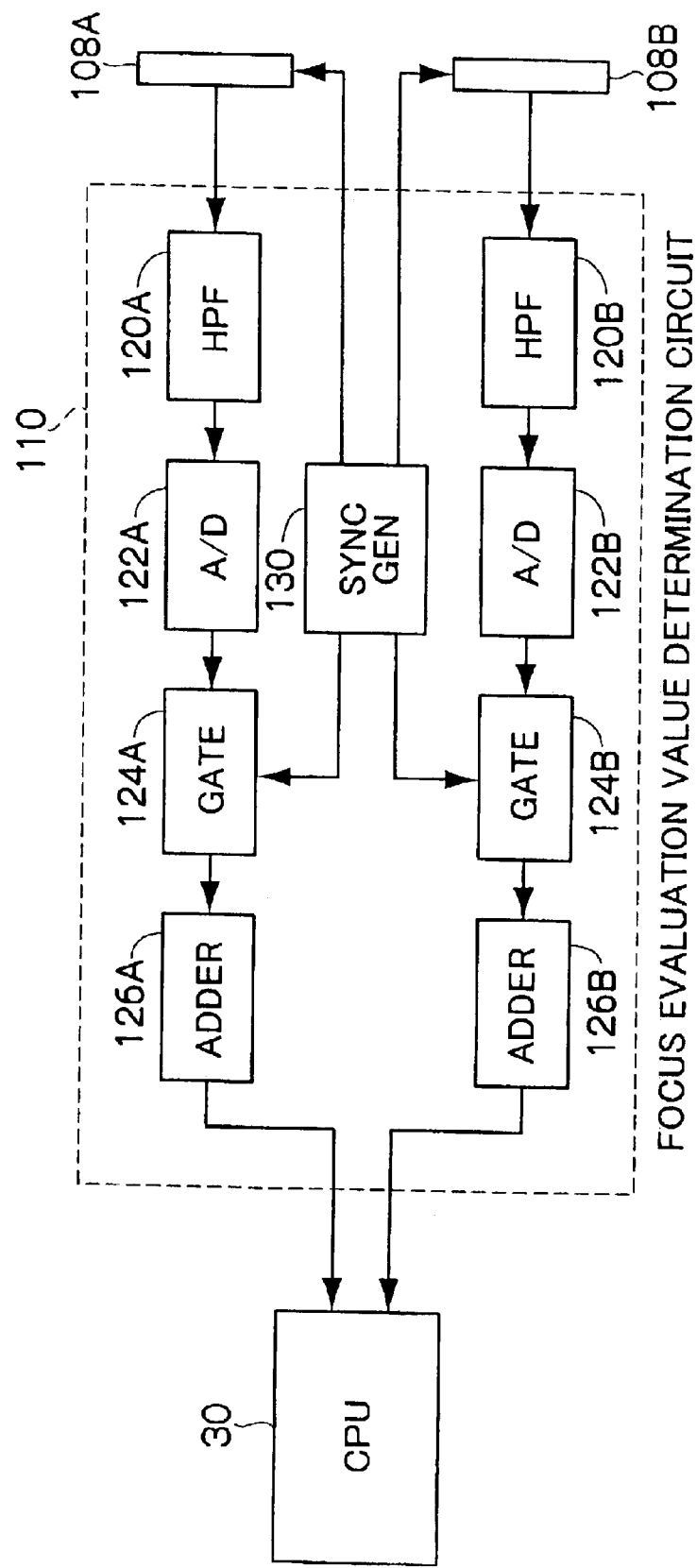
FIG. 10 is a diagram showing a structure of a focus evaluation value determination circuit in the AF of the optical path length difference system.

FIG. 10 is a diagram showing a structure of a focus evaluation value determination circuit 110 in the AF of the optical path length difference system equivalent to the focus evaluation value determination circuit 48 in FIG. 2. The video signals obtained from the pair of image pickup elements for focus state determination 108A and 108B are inputted in the focus evaluation value determination circuit 110, respectively. High-pass filters 120A and 120B, A/D converters 122A and 122B, gate circuits 124A and 124B, adder circuits 126A and 126B, which apply the same processing as the focus evaluation value determination circuit 48 of FIG. 2 to the respective video signals inputted from the image pickup elements for focus state determination 108A and 108B, are provided in the focus evaluation value determination circuit 110. Two focus evaluation value are generated according to the respective video signals inputted from the image pickup elements for focus state determination 108A and 108B. The focus evaluation value generated according to the video signal from the image pickup element for focus state determination 108A is referred to as a focus evaluation value of a channel A (chA) and the focus evaluation value generated according to the video signal from the image pickup element for focus state determination 108B is referred to as a focus evaluation value of a channel B (chB). Various synchronizing signals are given to the respective circuits such as the image pickup elements for focus state determination 108A and 108B and the gate circuits 124A and 124B from a synchronizing signal generation circuit 130 shown in the figure, whereby synchronization of processing of each circuit is realized.

The focus evaluation values of the chA and the chB generated by the focus evaluation value determination circuit 110 is given to the CPU 30 of the lens system. This CPU 30 is equivalent to the CPU 30 of the lens system shown in FIG. 2. In the case where the AF of the optical path length difference system is employed, the structure and the processing of the above-described embodiment as shown in FIG. 2 are applied in the same manner except a special structure and processing for implementing the AF of the optical path length difference system. Therefore, in the description of this lens system, potions identical with or similar to the lens system shown in FIG. 2 in terms of actions are designated by reference numerals and symbols identical with those in FIG. 2, and descriptions of the potions will be omitted.

In the case of executing the processing of the AF, as described in detail later, the CPU 30 controls a position of the focus lens FL such that a taking lens is brought into a focused state according to the focus evaluation values of the chA and the chB obtained from the focus evaluation determination circuit 110.

Figure 11:
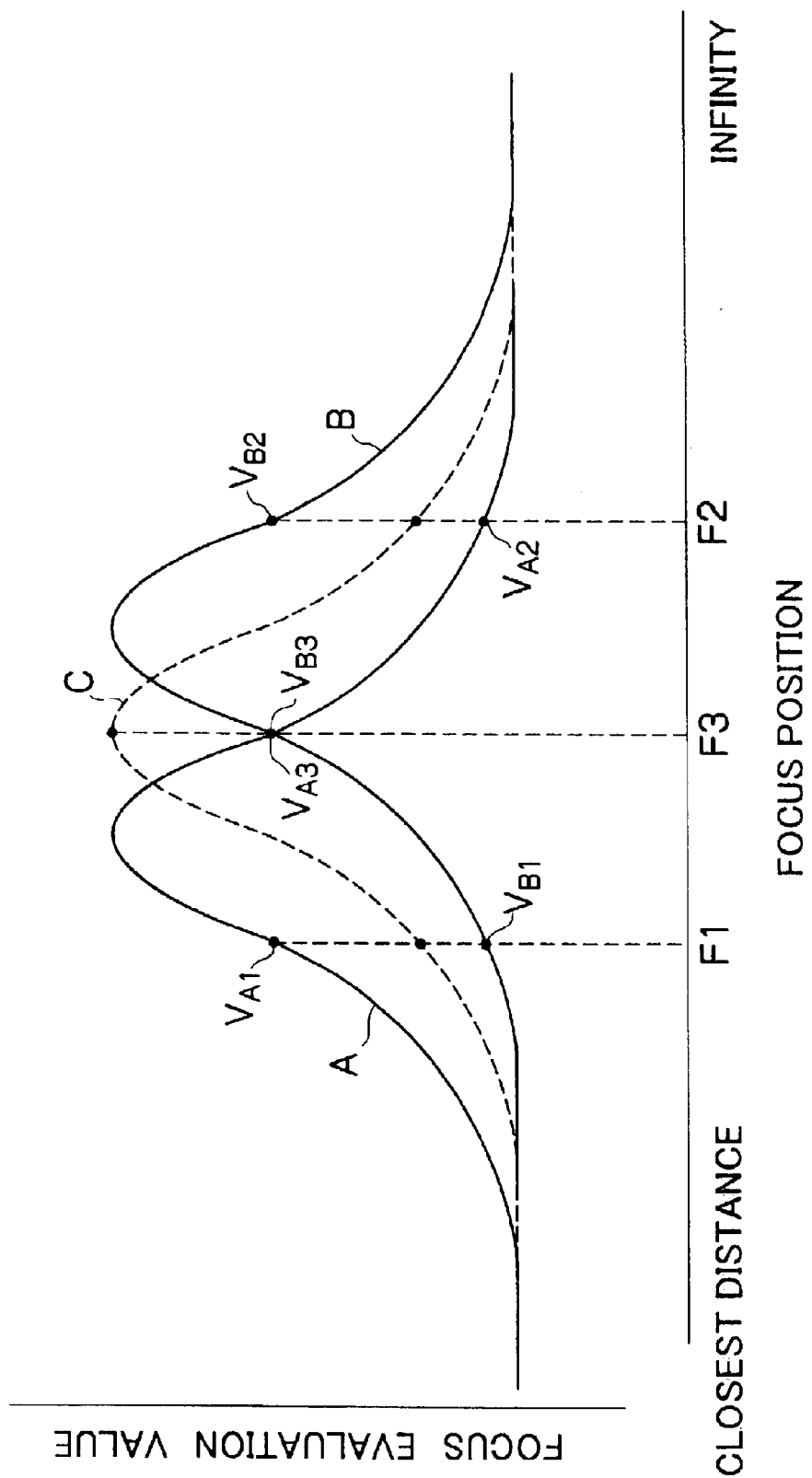
FIG. 11 is a graph showing an example of focus evaluation value characteristics.

Here, the focus state determination and the processing of the AF according to the focus evaluation value will be described. FIG. 11 is a graph showing distribution characteristics of focus evaluation values with respect to focus positions at the time when a certain subject is shot, in which a position of the focus lens FL of the taking lens (focus position) is plotted on the horizontal axis and a focus evaluation value is plotted on the vertical axis. A curve C indicated by a dotted line in the figure represents, in the case where it is assumed that a focus evaluation value is found according to a video signal from an image pickup element for picture (or image pickup element arranged in a position conjugate with the image pickup element for picture), the focus evaluation value with respect to the focus position. Curves A and B indicated by solid lines in the figure represent the focus evaluation values of the chA and the chB obtained from the image pickup elements for focus state determination 108A and 108B with respect to the focus position, respectively. In the figure, a position F3 where the focus evaluation value of the curve C becomes largest (maximal) is a focused position.

First, it is assumed that the focus position of the taking lens is set to F1 in the figure. In this case, a focus evaluation value $V_{A1}$ of the chA becomes a value corresponding to the position F1 of the curve A, and a focus evaluation value $V_{B1}$ of the chB becomes a value corresponding to the position F1 of the curve B. Further, in this case, since the focus evaluation value $V_{A1}$ of the chA is larger than the focus evaluation value $V_{B1}$ of the chB, it is seen that the focus position is in a state in which it is set closer to a closest distance side than the focused position (F3), that is, a state of a front focus.

On the other hand, it is assumed that the focus position of the taking lens is set to F2 in the figure. In this case, a focus evaluation value $V_{A2}$ of the chA becomes a value corresponding to the position F2 of the curve A, and a focus evaluation value $V_{B2}$ of the chB becomes a value corresponding to the position F2 of the curve B. Further, in this case, since the focus evaluation value $V_{A2}$ of the chA is smaller than the focus evaluation value $V_{B2}$ of the chB, it is seen that the focus position is in a state in which it is set closer to an infinity side than the focused position (F3), that is, a state of a rear focus.

On the contrary, it is assumed that the focus position of the taking lens is set to F3, that is, the focused position. In this case, a focus evaluation value $V_{A3}$ of the chA becomes a value corresponding to the position F3 of the curve A, and a focus evaluation value $V_{B3}$ of the chB becomes a value corresponding to the position F3 of the curve B. Further, in this case, since the focus evaluation value $V_{A3}$ of the chA and the focus evaluation value $V_{B3}$ of the chB become equal each other, it is seen that the focus position is in a state in which it is set in the focused position (F3).

In this way, it is possible to determine which of the front focus state, the rear focus state, and the focused state a current focus state of the taking lens is according to the focus evaluation values of the chA and the chB obtained from the focus evaluation value determination circuit 110.

Therefore, by controlling the position of the focus lens L according to the focus evaluation values of the chA and the chB obtained from the focus evaluation value generation section 110, the focus lens FL can be moved to the focused position.

That is, at the time of the processing of the AF, the CPU 30 obtains the focus evaluation values of the chA and the chB serially from the focus evaluation determination circuit 110 and judges which of the front focus state, the rear focus state, and the focused state the focus evaluation values of the chA and the chB indicate. Then, in the case of the state which is judged as the front focus, the CPU 30 moves the focus lens FL in the infinity direction. In the case of the state which is judged as the rear focus, the CPU 30 moves the focus lens FL in the closest distance direction. In the case of the state which is judged as the focused state, the CPU 30 stops the focus lens FL in that position. Consequently, the focus lens FL is set in the focused position.

The CPU 30 executes processing corresponding to a mode selected by the AF mode switch 50 of the focus demand 28 among the one-shot AF mode, the automatic one-shot AF mode, the continuous AF mode, and the automatic continuous AF mode as explained in the above-described embodiment.

For example, in the case where the AF mode is set in the automatic continuous mode, the CPU 30 determines a focus state by comparing the focus evaluation values of the chA and the chB obtained from the focus evaluation value determination circuit 110 serially when the operation of the MF (operation of the focus ring 28A of the focus demand 28) is not executed. In the case where the focus lens FL is not in the focused state, the CPU 30 controls the position of the focus lens FL such that the focus lens FL is brought into the focused state. When an operation of the MF is executed, the CPU 30 drives the focus lens FL in accordance with the operation of the MF (focus instruction signal from the focus demand 28). Then, in the case where the operation of the MF stops, the CPU 30 resumes the processing of the AF.

By adopting the AF of the optical path length difference system as described above, the operation of wobbling which is required in the lens system of FIG. 2 becomes unnecessary, and the switching from the MF to the AF is executed smoothly. Since malfunction due to a change in illumination and flicker is less likely to occur in the AF of the optical path length difference system, reliability of the AF increases.

At the time when the processing of the MF is switched to the processing of the AF in the above-described lens system in which the AF of the optical path length difference system is adopted, two methods described below is applicable. A first method is a method of moving the focus lens FL to a focused position unconditionally according to the processing of the AF when the processing of the MF is switched to the processing of the AF. A second method is a method of holding the focus lens FL in a position set by the MF while a focus state does not change even if the processing of the MF is switched to the processing of the AF and moving the focus lens FL to a focused position according to the processing of the AF in the case where the focus state has changed.

In the case where the first method is applied, upon judging that an operation of the MF has stopped, the CPU 30 switches the processing of the MF to the processing of the AF and, at the same time, obtains the focus evaluation values of the chA and the chB from the focus evaluation value determination circuit 110. Then, the CPU 30 compares the focus evaluation values of the chA and the chB to determine a focus state and, in the case where the focus state does not indicate the focused state, moves the focus lens FL such that the focus state changes to the focused state.

On the other hand, in the case where the second method is applied, upon judging that an operation of the MF has stopped, the CPU 30 obtains focus evaluation values of the chA and the chB at that time from the focus evaluation value determination circuit 110 and grasps a focus state at that time. Then, the CPU 30 resumes the processing of the AF. However, in the case where there is no change in a focus state which is determined by the focus evaluation values of the chA and the chB serially, the CPU 30 keeps the focus lens FL stopped even if the focus state does not indicate the focused state. In the case where a change occurs in the focus state, the CPU 30 moves the focus lens FL such that the focus state changes to the focused state as usual according to the focus evaluation value of the chA and the chB obtained from the focus evaluation value determination circuit 110. Whether or not the focus state has changed can be judged from whether or not a ratio of the focus evaluation values of the chA and the chB has changed, for example. In this case, since it is not judged that the focus state has changed due to a change in illumination or flicker regardless of the fact that there is no change in a subject (positional relationship of an object), it is less likely that malfunction occurs.

Both the above two methods can be applied as a processing method in switching the processing of the MF to the processing of the AF in each AF mode. Which method is to be adopted may be decided in advance for each AF mode or may be selected by a user arbitrarily.

Concerning the AF of the optical path length difference system, the case where two focus evaluation values are obtained from the two image pickup elements for focus state determination 108A and 108B to execute processing of the AF has been described. However, the present invention is not limited to this but may be applied to the case where AF control is executed according to three or more focus evaluation values which are obtained from three or more image pickup elements arranged in positions with different optical path lengths.

Figure 12:
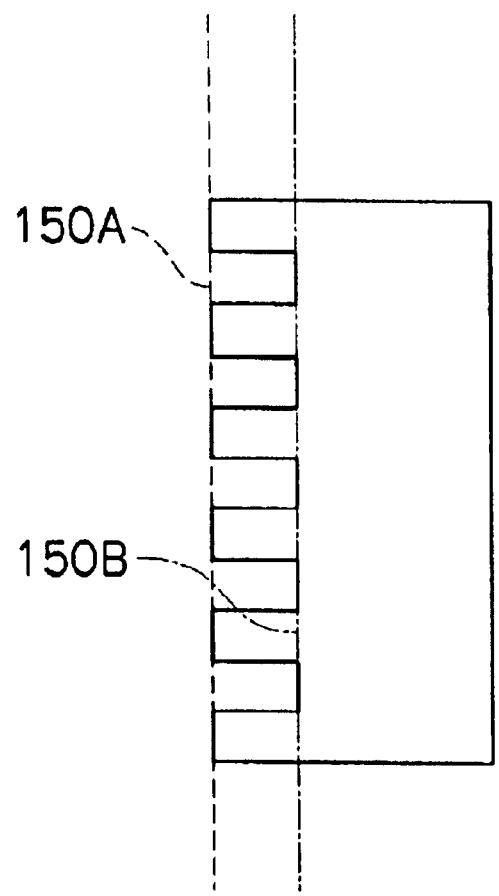
FIG. 12 is a side view showing a structure of a simplex image pickup element having image pickup surfaces in positions of different optical path lengths.

In the AF of the optical path length difference system, on the premise that the image pickup elements for focus state determination 108A and 108B are separate bodies, subject light is branched to the respective image pickup elements for focus state determination 108A and 108B to be made incident thereon. However, it is also possible to integrate them and use a single image pickup element, which has image pickup surfaces 150A and 150B in positions with different optical path lengths as shown in FIG. 12, as an image pickup element for focus state determination. In this case, a member for branching subject light incident on the image pickup element for focus state determination becomes unnecessary.

Further, the above-described embodiment has been described with the case where the present invention is applied to the television camera system as an example. However, the present invention is not limited to this but can be applied to a video camera or a still camera that captures a still image.

As described above, according to the lens system in accordance with the present invention, if an operation of the manual focus adjustment (MF) is executed when the auto-focus adjustment (AF) is continuously executed, focus adjustment is executed by the MF and, thereafter, the MF is not switched to the AF unless start of execution of the AF is instructed. Therefore, for example, the lens system is effective in the case where an operator wishes to use the continuous AF only for a short time and switch to the MF or in the case where an operator wishes to reflect focus adjustment of the MF on an image such as making a camera not focused on a subject intentionally during execution of the continuous AF.

There is an advantage which has not been experienced in the past that, even in the case where the MF is automatically switched to the continuous AF after focus adjustment is executed by the MF, switching from the MF to the AF is executed smoothly by using the optical path length difference system as a method of the AF, and reliability of the AF increases.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens system which is adapted to allow manual focus adjustment for manually executing focus adjustment of a taking lens by manually operating an operation member and auto-focus adjustment for automatically executing focus adjustment of the taking lens according to information concerning a subject of shooting, comprising:

a continuous AF execution device which continuously executes the auto-focus adjustment;

an AF start switch through which start of continuous execution of the auto-focus adjustment by the continuous AF execution device is instructed;

an AF mode switch through which one of a first and second AF mode is chosen;

first AF processing device which, where the first AF mode is chosen through the AF mode switch, when start of execution of the auto-focus adjustment is instructed through the AF start switch, starts execution of the auto-focus adjustment by the continuous AF execution device, when the operation member for manually executing focus adjustment is operated during continuous execution of the auto-focus adjustment by the continuous AF execution device, switches focus adjustment of the taking lens from auto-focus adjustment to manual focus adjustment and makes manual focus adjustment valid until start of execution of the auto-focus adjustment is instructed through the AF start switch; and a second AF processing device which, when the second AF mode is chosen through the AF mode switch, when the operation member for manually executing focus adjustment is operated during continuous execution of the auto-focus adjustment by the continuous AF execution device, switches focus adjustment of the taking lens from auto-focus adjustment to manual focus adjustment and makes manual focus adjustment through the manual operation member valid, when operation of the manual operation member is stopped, automatically switches focus adjustment of the taking lens from manual adjustment to auto-focus adjustment by the continuous AF execution device.

2. The lens system as defined in claim 1, wherein the auto-focus adjustment is of a contrast system using video signals obtained by picking up images through the taking lens with a plurality of image pickup surfaces arranged in positions with different optical path lengths.

3. A lens system which is adapted to allow manual focus adjustment for manually executing focus adjustment of a taking lens by manually operating an operation member and auto-focus adjustment for automatically executing focus adjustment of the taking lens, the auto-focus adjustment being of a contrast system using video signals obtained by picking up images through the taking lens with a plurality of image pickup surfaces arranged in positions with different optical path lengths, the lens system comprising:

a continuous AF execution device which continuously executes the auto-focus adjustment;

an AF start switch through which start of continuous execution of the auto-focus adjustment by the continuous AF execution device is instructed;

an AF mode switch through which one of a first and second AF mode is selected;

a first focus adjustment switching device which, when the operation member for the manual focus adjustment is operated in a case where the auto-focus adjustment is continuously executed, switches focus adjustment of the taking lens from the auto-focus adjustment to the manual focus adjustment to make the manual focus adjustment with the operation member effective and, when the operation member becomes not operated, automatically switches the focus adjustment of the taking lens from the manual focus adjustment to the auto-focus adjustment; and a second focus adjustment switching device which, when the operation member for the manual focus adjustment is operated in the case where the auto-focus adjustment is continuously executed by the AF execution device, switches focus adjustment of the taking lens from the auto-focus adjustment to the manual focus adjustment and keeps the manual focus adjustment with the operation member effective until start of continuous execution of the auto-focus adjustment is instructed through the AF start device.

* * * * *